(12) United States Patent
Itsui

(10) Patent No.: US 12,162,493 B2
(45) Date of Patent: Dec. 10, 2024

(54) MERGE ASSISTANCE DEVICE AND MERGE ASSISTANCE METHOD

(71) Applicant: Mitsubishi Electric Corporation, Tokyo (JP)

(72) Inventor: Takayuki Itsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 17/951,346

(22) Filed: Sep. 23, 2022

(65) Prior Publication Data

US 2023/0146552 A1 May 11, 2023

(30) Foreign Application Priority Data

Nov. 5, 2021 (JP) .................. 2021-180857

(51) Int. Cl.
*B60W 30/18* (2012.01)
*B60W 40/04* (2006.01)
*B60W 60/00* (2020.01)
*G06V 20/56* (2022.01)

(52) U.S. Cl.
CPC ...... *B60W 30/18163* (2013.01); *B60W 40/04* (2013.01); *B60W 60/001* (2020.02); *G06V 20/588* (2022.01); *B60W 2420/403* (2013.01); *B60W 2552/53* (2020.02); *B60W 2556/40* (2020.02); *B60W 2556/50* (2020.02)

(58) Field of Classification Search
CPC .......... B60W 30/18163; B60W 40/04; B60W 60/001; B60W 2420/403; B60W 2552/53; B60W 2556/40; B60W 2556/50; G06V 20/588
USPC ........................................ 701/41, 42, 43, 44
See application file for complete search history.

(56) References Cited

FOREIGN PATENT DOCUMENTS

JP 4645429 B2 3/2011

*Primary Examiner* — Hai H Huynh
(74) *Attorney, Agent, or Firm* — Sughrue Mion, PLLC; Richard C. Turner

(57) ABSTRACT

A merge assistance device of the present disclosure includes: an own-vehicle position acquisition unit for acquiring an own-vehicle position; a provisional merge point setting unit for setting a provisional merge point on an own lane; a lane-to-lane distance calculation unit for calculating a lane-to-lane distance from the own lane to the target lane; an attention point setting unit for setting a frontward attention point and a rearward attention point on the own lane; a first approximation expression deriving unit for deriving a first approximation expression approximating frontward attention points and rearward attention points; a second approximation expression deriving unit for deriving a second approximation expression approximating the target lane; and a merging-possible area start point estimation unit for estimating a merging-possible area start point on the target lane on the basis of an own-lane width, a target-lane width, and the first and second approximation expressions.

15 Claims, 12 Drawing Sheets

MERGE ASSISTANCE DEVICE AND MERGE ASSISTANCE METHOD

BACKGROUND OF THE DISCLOSURE

1. Field of the Disclosure

The present disclosure relates to a merge assistance device and a merge assistance method.

2. Description of the Background Art

For putting autonomous driving into practical use, being developed is technology in which the own-vehicle position is determined by a locator and map information relevant to the determined own-vehicle position is utilized to achieve high-level vehicle control.

One example of high-level vehicle control is autonomous merging control in a scene of merging from a merging lane to a main lane. For achieving the autonomous merging control, accurate position information about a merging-possible area start point, e.g., a hatched-marking area, in particular, a hatched-marking area leading end, is needed.

Patent Document 1: Japanese Patent No. 4645429

Map information that a locator has includes position information about merge start points. The position information about merge start points is indirectly given as boundaries between section types such as a main lane, a merging lane, a split lane, and a ramp. A boundary at which the section type is switched from a ramp to a merging lane may be considered to be a merge start point.

A merge start point acquired from the map information that the locator has depends on the content of the map that the locator has, and does not necessarily coincide with a merging-possible area start point, e.g., a hatched-marking area leading end on a road. This is because the merge start point may be located frontward of the hatched-marking area leading end or may be located rearward thereof.

Patent Document 1 discloses an on-vehicle device which estimates a merging-possible area start point through image processing such as overhead image conversion using a hatched-marking area image acquired by an on-vehicle camera. However, in the case of estimating the merging-possible area start point through image processing on the hatched-marking area image, error occurs due to the conversion processing, thus causing a problem that estimation accuracy might be insufficient in autonomous merging control.

SUMMARY OF THE DISCLOSURE

The present disclosure has been made to solve the above problem and an object of the present disclosure is to provide a merge assistance device and a merge assistance method for estimating a merging-possible area start point with high accuracy by utilizing map information that a locator has.

A merge assistance device according to the present disclosure is for assisting merge from an own lane on which an own vehicle travels, to a target lane, and includes: an own-vehicle position acquisition unit for acquiring an own-vehicle position determined by a locator; a provisional merge point setting unit for setting a provisional merge point on the own lane on the basis of coordinate information of the own lane and the target lane included in map information stored in a map information database; a lane-to-lane distance calculation unit for calculating a lane-to-lane distance from each point on the own lane to each point on the target lane; an attention point setting unit which, on the basis of a provisional merge point lane-to-lane distance from the provisional merge point to the target lane calculated by the lane-to-lane distance calculation unit, sets one or more frontward attention points on the own lane on a side frontward of the provisional merge point and sets one or more rearward attention points on the own lane on a side rearward of the provisional merge point; a first approximation expression deriving unit for deriving a first approximation expression approximating coordinates of the one or more frontward attention points and the one or more rearward attention points; a second approximation expression deriving unit for deriving a second approximation expression approximating coordinates on the target lane including coordinates of a position at a shortest distance from the provisional merge point; and a merging-possible area start point estimation unit which, on the basis of an own-lane width and a target-lane width included in the map information, and the first approximation expression and the second approximation expression, estimates, on the target lane, a merging-possible area start point which is a start point of an area where the own vehicle becomes able to merge from the own lane to the target lane.

A merge assistance method according to the present disclosure is for assisting merge from an own lane on which an own vehicle travels, to a target lane, and includes: an own-vehicle position acquisition step of acquiring an own-vehicle position determined by a locator; a provisional merge point setting step of setting a provisional merge point on the own lane on the basis of coordinate information of the own lane and the target lane included in map information stored in a map information database; a lane-to-lane distance calculation step of calculating a lane-to-lane distance from each point on the own lane to each point on the target lane; an attention point setting step of, on the basis of a provisional merge point lane-to-lane distance from the provisional merge point to the target lane calculated in the lane-to-lane distance calculation step, setting one or more frontward attention points on the own lane on a side frontward of the provisional merge point and setting one or more rearward attention points on the own lane on a side rearward of the provisional merge point; a first approximation expression deriving step of deriving a first approximation expression approximating coordinates of the one or more frontward attention points and the one or more rearward attention points; a second approximation expression deriving step of deriving a second approximation expression approximating coordinates on the target lane including coordinates of a position at a shortest distance from the provisional merge point; and a merging-possible area start point estimation step of, on the basis of an own-lane width and a target-lane width included in the map information, and the first approximation expression and the second approximation expression, estimating, on the target lane, a merging-possible area start point which is a start point of an area where the own vehicle becomes able to merge from the own lane to the target lane.

In the merge assistance device and the merge assistance method according to the present disclosure, using the provisional merge point acquired from map information that the locator has, frontward attention points and rearward attention points are set on the own lane on the basis of the lane-to-lane distance from the provisional merge point to the target lane. Using the frontward attention points and the rearward attention points, the first approximation expression representing the own lane is derived. The second approximation expression is derived by approximating coordinates on the target lane including coordinates of the position at the shortest distance from the provisional merge point. The merging-possible area start point is estimated on the basis of the first approximation expression and the second approximation expression. This provides an effect of obtaining a merge assistance device and a merge assistance method that can estimate the merging-possible area start point with high accuracy.

DETAILED DESCRIPTION OF THE PREFERRED EMBODIMENTS OF THE DISCLOSURE

First Embodiment

Figure 1:
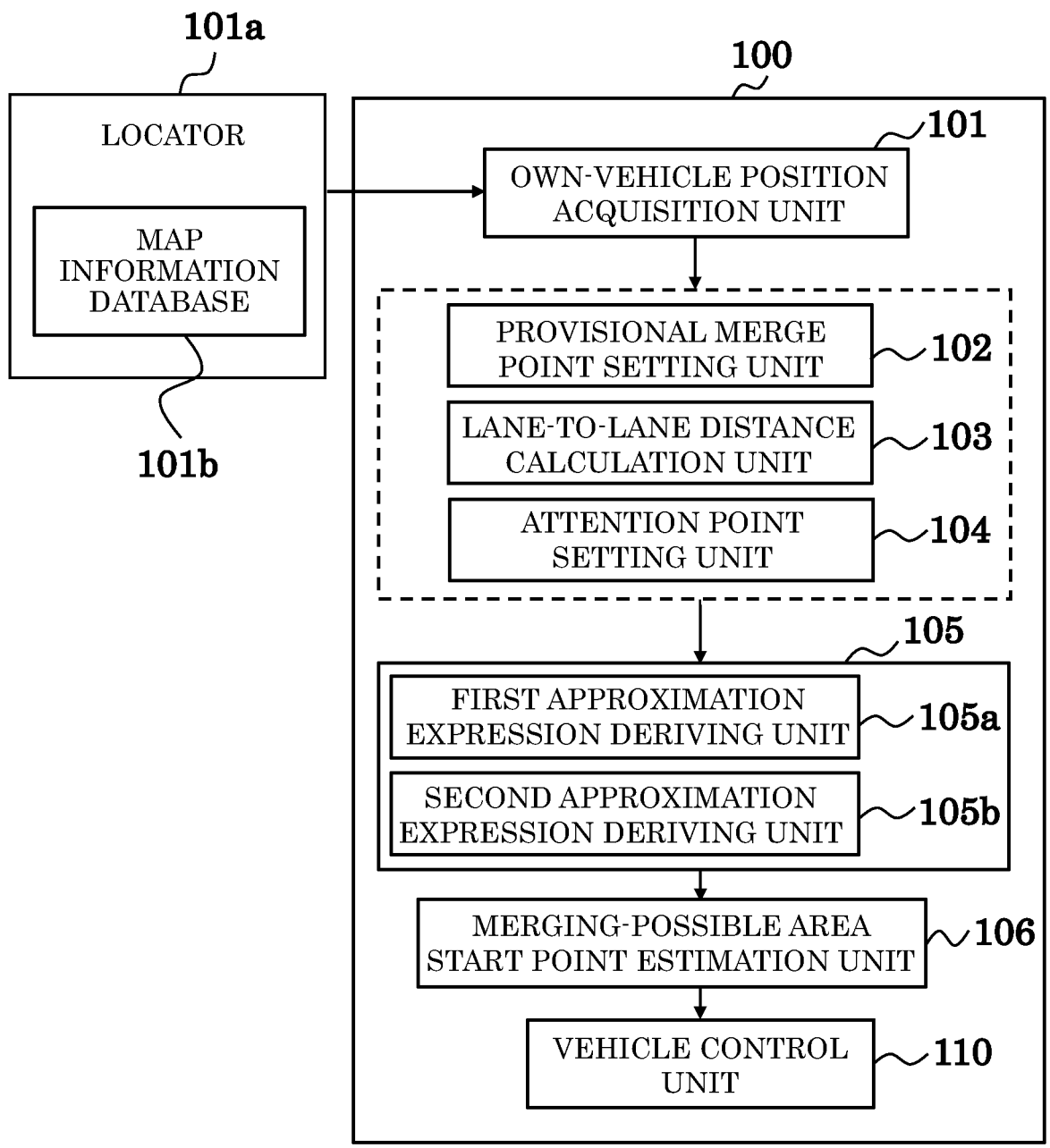
FIG. 1 is a function block diagram showing the configuration of a merge assistance device according to the first and second embodiments of the present disclosure.

FIG. 1 is a function block diagram showing the configuration of a merge assistance device 100 according to the first embodiment of the present disclosure. The merge assistance device 100 shown in FIG. 1 includes an own-vehicle position acquisition unit 101, a provisional merge point setting unit 102, a lane-to-lane distance calculation unit 103, an attention point setting unit 104, an approximation expression deriving unit 105, a merging-possible area start point estimation unit 106, and a vehicle control unit 110. In the following description, a case of mentioning "coordinates" may mean a "point" represented by the "coordinates", and a case of mentioning a "point" may mean "coordinates" corresponding to the "point".

From a locator 101a provided outside the merge assistance device 100, the own-vehicle position acquisition unit 101 acquires an own-vehicle position, and map information relevant to the own-vehicle position and stored in a map information database 101b inside the locator 101a. In FIG. 1, the map information database 101b is provided inside the locator 101a. However, the map information database 101b may be provided outside the locator 101a, or may be provided inside the merge assistance device 100.

The own-vehicle position acquisition unit 101 outputs information such as the own-vehicle position and the map information acquired from the locator 101a, to the provisional merge point setting unit 102.

The locator 101a is for specifying the position of the own vehicle, and determines the own-vehicle position by using a global navigation satellite system (GNSS) receiver, for example. The own-vehicle position may be detected using a device such as an inertial navigation device.

The map information database 101b inside the locator 101a stores map information. The map information includes at least a section type, coordinate information of an own lane 1, coordinate information of a target lane 2, the positional relationship between the own lane 1 and the target lane 2, an own-lane width, a target-lane width, and the like. The coordinate information of the own lane 1, the coordinate information of the target lane 2, and the like are provided at certain intervals to the map information.

The locator 101a detects the present position of the own vehicle on the map on the basis of positioning data for the own-vehicle position acquired by the GNSS receiver and map information around the own-vehicle position stored in the map information database 101b, for example, and outputs the detected present position to the own-vehicle position acquisition unit 101.

Figure 3:
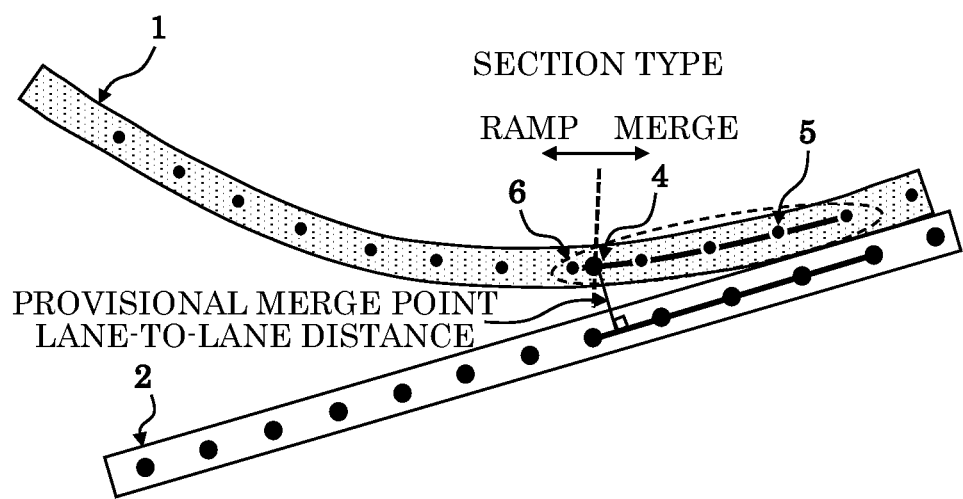
FIG. 3 schematically shows a merge scene of an own vehicle merging from an own lane to a target lane in the merge assistance method according to the first embodiment.

The provisional merge point setting unit 102 sets a provisional merge point 4 on the own lane 1 on the basis of the coordinate information of the own lane 1 and the target lane 2 included in the map information stored in the map information database 101b. As an example of the provisional merge point 4, as shown in FIG. 3, coordinates of a section-type switchover point at which the section type is switched from ramp to merge may be calculated, and the calculated coordinates may be set as the provisional merge point 4.

The lane-to-lane distance calculation unit 103 calculates a distance from each point on the own lane 1 to each point on the target lane 2, i.e., a lane-to-lane distance. The lane-to-lane distance calculation unit 103 can also calculate a lane-to-lane distance from each attention point on the own lane 1 to each point on the target lane 2. In particular, the lane-to-lane distance from the provisional merge point 4 to the target lane 2 is calculated as a provisional merge point lane-to-lane distance LM. A method for calculating the provisional merge point lane-to-lane distance LM will be described later.

The attention point setting unit 104 sets one or more frontward attention points 5 on the own lane 1 on the side frontward of the provisional merge point 4, on the basis of the provisional merge point lane-to-lane distance LM outputted from the lane-to-lane distance calculation unit 103. The attention point setting unit 104 sets one or more rearward attention points 6 on the own lane 1 on the side rearward of the provisional merge point 4. FIG. 3 shows examples of the frontward attention points 5 and the rearward attention points 6. A method for setting the frontward attention points 5 and the rearward attention points 6 will be described later.

The approximation expression deriving unit 105 includes a first approximation expression deriving unit 105a and a second approximation expression deriving unit 105b. The first approximation expression deriving unit 105a and the second approximation expression deriving unit 105b may be integrated as one unit.

The approximation expression deriving unit 105 derives an approximation expression approximating coordinates on the own lane 1 or the target lane 2. The first approximation expression deriving unit 105a in the approximation expression deriving unit 105 derives a first approximation expression approximating coordinates of one or more frontward attention points and one or more rearward attention points. That is, the first approximation expression represents an approximation of the own lane 1. On the other hand, the second approximation expression deriving unit 105b in the approximation expression deriving unit 105 derives a second approximation expression approximating coordinates on the target lane 2 including coordinates of the position at the shortest distance from the provisional merge point 4. That is, the second approximation expression represents an approximation of the target lane 2 near the provisional merge point 4 on the own lane 1. The details of deriving for the approximation expressions and the like will be described later.

The merging-possible area start point estimation unit 106 estimates, on the target lane 2, a merging-possible area start point which is a start point of an area where the own vehicle becomes able to merge from the own lane 1 which is the merging lane to the target lane 2, on the basis of the own-lane width, the target-lane width, the first approximation expression, and the second approximation expression.

The vehicle control unit 110 controls traveling of the own vehicle toward the merging-possible area start point on the target lane 2 estimated by the merging-possible area start point estimation unit 106.

The components of the merge assistance device 100 according to the first embodiment and the locator 101a are as described above.

Next, operation of the merge assistance device 100 according to the first embodiment, i.e., a merge assistance method, will be described with reference to FIG. 2, FIG. 3, and FIG. 4.

Figure 2:
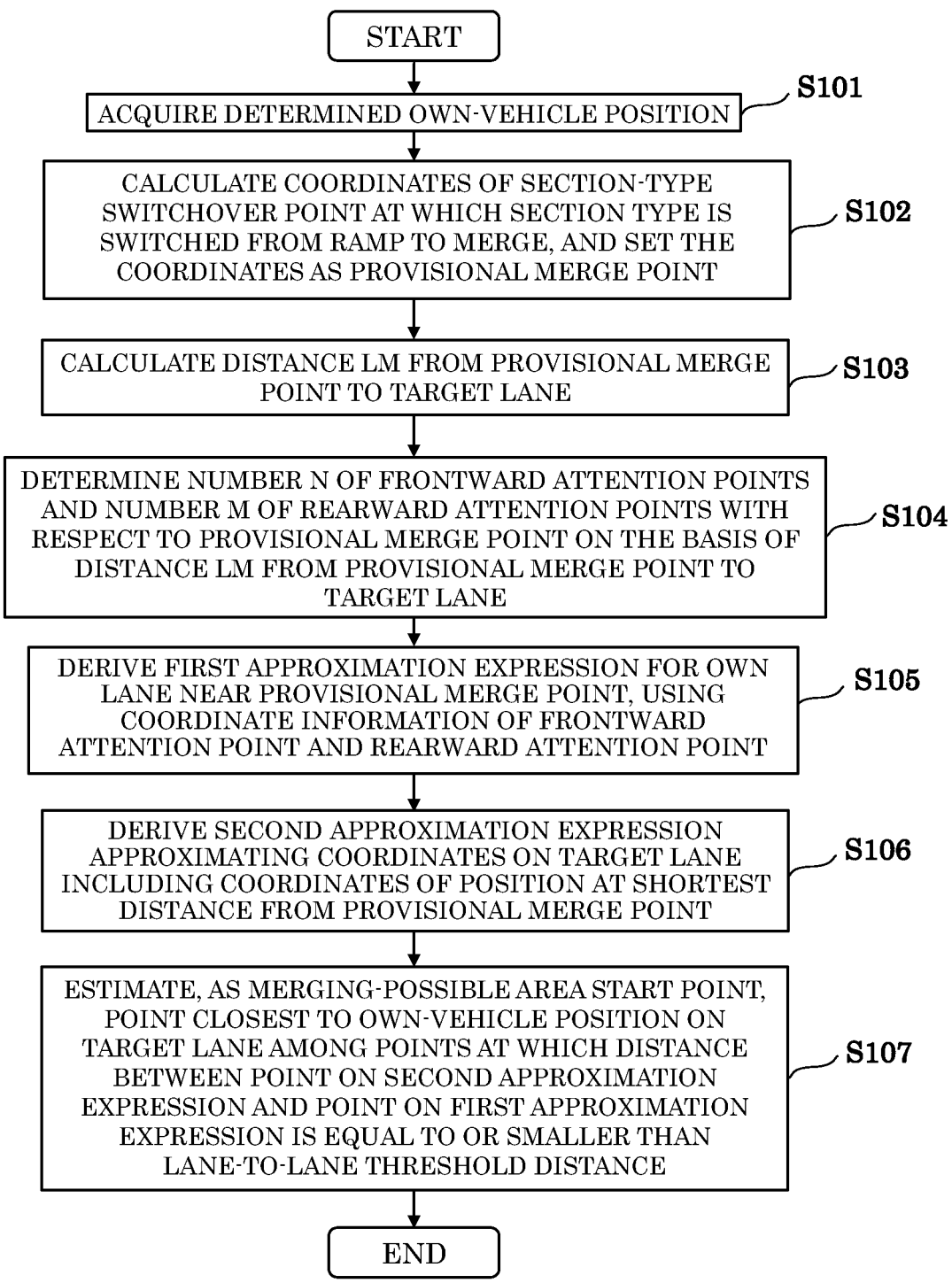
FIG. 2 is a flowchart showing a merge assistance method according to the first embodiment.
Figure 4:
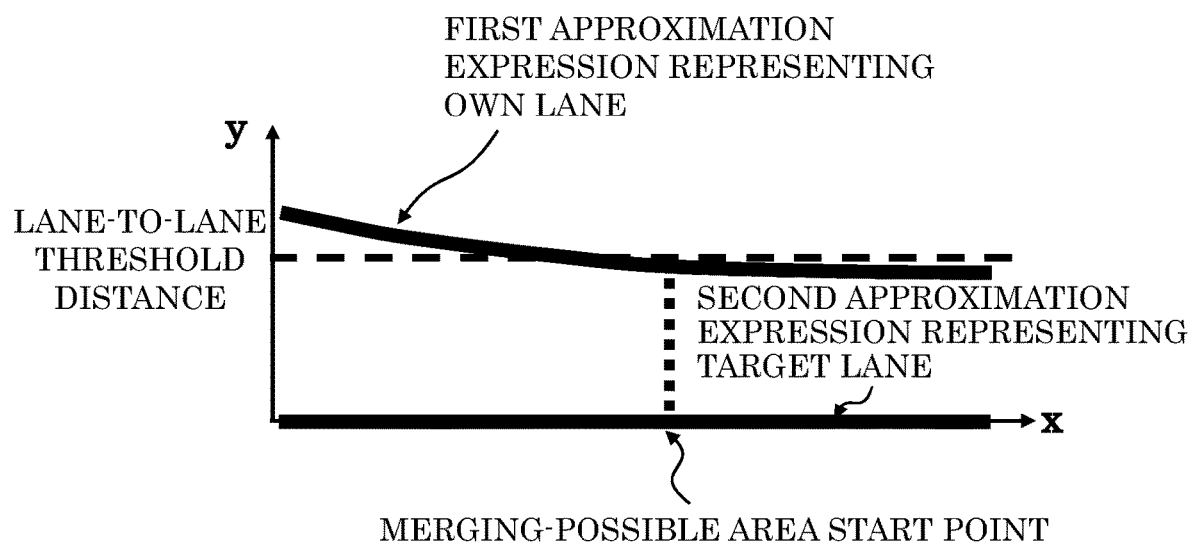
FIG. 4 schematically shows a method for estimating a merging-possible area start point in the merge assistance method according to the first embodiment.

FIG. 2 is a flowchart showing the merge assistance method according to the first embodiment, FIG. 3 schematically shows a merge scene in the merge assistance method according to the first embodiment, and FIG. 4 schematically shows a method for estimating the merging-possible area start point in the merge assistance method according to the first embodiment.

Hereinafter, with reference to the flowchart in FIG. 2, the merge assistance method according to the first embodiment will be described. First, in step S101, the own-vehicle position is acquired by the locator 101a determining the own-vehicle position. The information of the own-vehicle position detected by the locator 101a is outputted to the own-vehicle position acquisition unit 101.

In step S102, from the map information stored in the map information database 101b inside the locator 101a, coordinates of a section-type switchover point at which the section type is switched from ramp to merge in map information around the own-vehicle position are calculated and set as the provisional merge point 4. This setting method for the provisional merge point 4 is merely an example. Another setting method may be used as long as the provisional merge point 4 is set on the own lane 1 on the basis of coordinate information of the own lane 1 on which the own vehicle is traveling and the target lane 2, included in the map information stored in the map information database 101b.

In step S103, on the basis of the provisional merge point 4 set in step S102, the coordinate information of the target lane 2 included in the map information, and the positional relationship between the own lane 1 and the target lane 2, the provisional merge point lane-to-lane distance LM from the provisional merge point 4 to the target lane 2 is calculated. For example, as shown in FIG. 3, in a case where the target lane 2 is almost straight, the length of a perpendicular from the provisional merge point 4 to the target lane 2 on a plan view of the map may be calculated as the provisional merge point lane-to-lane distance LM. Alternatively, the shortest distance from the provisional merge point 4 on the own lane 1 to the target lane 2 may be calculated as the provisional merge point lane-to-lane distance LM.

In step S104, on the basis of the provisional merge point lane-to-lane distance LM from the provisional merge point 4 to the target lane 2, a number N of frontward attention points 5 and a number M of rearward attention points 6 with respect to the provisional merge point 4 are determined. That is, on the basis of the provisional merge point lane-to-lane distance LM outputted from the lane-to-lane distance calculation unit 103, the attention point setting unit 104 sets N frontward attention points 5 at intervals on the own lane 1 on the side frontward of the provisional merge point 4. In addition, the attention point setting unit 104 sets M rearward attention points 6 at intervals on the own lane 1 on the side rearward of the provisional merge point 4. As the provisional merge point lane-to-lane distance LM from the provisional merge point 4 to the target lane 2 becomes longer, the numbers of the attention points proportionally increase. It is desirable that the intervals of the attention points are constant, but the intervals may not necessarily be constant.

The number N of the frontward attention points 5 may be one or more, i.e., N≥1. The number M of the rearward attention points 6 may be one or more, i.e., M≥1. For example, in the case of FIG. 3, if the provisional merge point lane-to-lane distance LM from the provisional merge point 4 to the target lane 2 is great, a hatched-marking area leading end (not shown) is considered to be present frontward of the provisional merge point 4, and thus a large number of frontward attention points 5 are set. That is, the number N of the frontward attention points 5 is set to 4, and the number M of the rearward attention points 6 is set to 1.

In step S105, the first approximation expression representing the own lane 1 near the provisional merge point 4 is derived using the coordinate information of the frontward attention point 5 and the rearward attention point 6 included in the coordinate information of the own lane 1. Deriving for the first approximation expression is performed by the first approximation expression deriving unit 105a.

In step S106, the second approximation expression for the target lane 2 is derived by approximating coordinates on the target lane 2 including the coordinates of the position at the shortest distance from the provisional merge point 4. Deriving for the second approximation expression is performed by the second approximation expression deriving unit 105b.

In step S107, among points at which a lane-to-lane distance LS which is a distance between a point on the second approximation expression representing the target lane 2 and a point on the first approximation expression representing the own lane 1 is equal to or smaller than a lane-to-lane threshold distance, a point closest to the own-vehicle position, on the target lane 2, is estimated as a merging-possible area start point. The lane-to-lane threshold distance is set to an appropriate value in accordance with the own-lane width and the target-lane width.

In the subsequent process from step S105, as shown in FIG. 4, the target lane 2 may be approximated as a straight line (second approximation expression), and with the target lane 2 defined as x axis and an axis orthogonal to the x axis defined as y axis, the approximation expression (first approximation expression) for the own lane 1 may be represented as a function f, i.e., y=f(x). In FIG. 4, the y-axis-direction interval between the first approximation expression and the second approximation expression corresponds to the lane-to-lane distance LS. Among points on the target lane 2 at which the lane-to-lane distance LS is equal to or smaller than the lane-to-lane threshold distance, a point closest to the own-vehicle position is estimated as the merging-possible area start point.

The vehicle control unit 110 outputs a control quantity for the own vehicle on the basis of the merging-possible area start point on the target lane 2 estimated by the merging-possible area start point estimation unit 106. For example, in a case of using vehicle control technology such as model prediction control, vehicle control is performed with a constraint condition set so as not to perform lane change before the merging-possible area start point.

Effects of First Embodiment

As described above, in the merge assistance device and the merge assistance method according to the first embodiment, using the provisional merge point 4 which is a merge start point acquired from map information in the locator 101a, the frontward attention point 5 and the rearward attention point 6 are set on the own lane 1 on the basis of the provisional merge point lane-to-lane distance LM from the provisional merge point 4 to the target lane 2. Using the attention points, the first approximation expression representing the own lane 1 near the provisional merge point 4 is derived, and further, the second approximation expression is derived by approximating the target lane 2 including the coordinates of the position at the shortest distance from the provisional merge point 4. A point on the target lane 2 at which the lane-to-lane distance LS between the own lane 1 and the target lane 2 is equal to or smaller than the lane-to-lane threshold distance is estimated as the merging-possible area start point. This provides an effect of obtaining a merge assistance device and a merge assistance method that enable highly accurate estimation for the merging-possible area start point when the own vehicle merges from the own lane 1 to the target lane 2.

Second Embodiment

Figure 5:
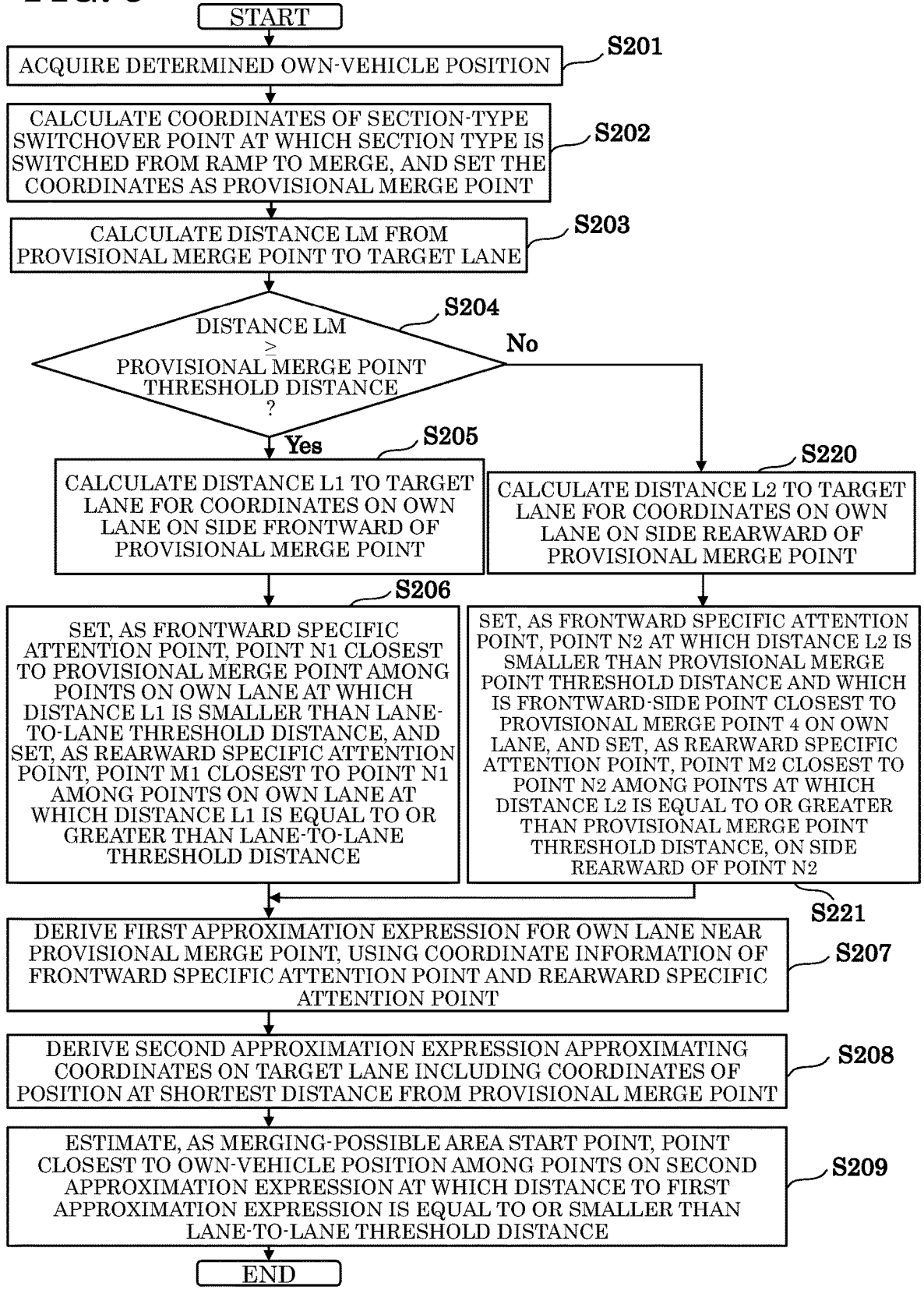
FIG. 5 is a flowchart showing a merge assistance method according to the second embodiment.
Figure 6:
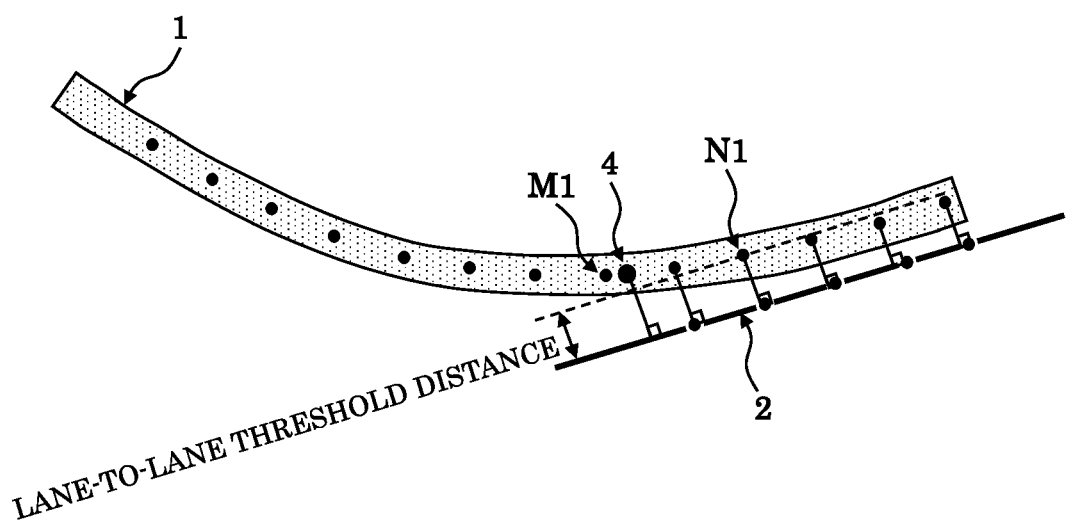
FIG. 6 schematically shows a merge scene of an own vehicle merging from an own lane to a target lane in the merge assistance device according to the second embodiment.

A merge assistance device used in a merge assistance method according to the second embodiment of the present disclosure is the same as that in the first embodiment, and therefore description of the merge assistance device is omitted. With reference to FIG. 5 and FIG. 6, the merge assistance method according to the second embodiment will be described.

FIG. 5 is a flowchart showing the merge assistance method according to the second embodiment, and FIG. 6 schematically shows a merge scene of the own vehicle merging from the own lane 1 to the target lane 2 in the merge assistance device according to the second embodiment. Hereinafter, with reference to the flowchart in FIG. 5, the merge assistance method according to the second embodiment will be described.

Processing in steps S201 to S203 is the same as the processing in steps S101 to S103 in the flowchart in FIG. 2, and therefore description thereof is omitted.

In step S204, whether or not the provisional merge point lane-to-lane distance LM from the provisional merge point 4 to the target lane 2 is equal to or greater than a provisional merge point threshold distance, is determined.

If the provisional merge point lane-to-lane distance LM from the provisional merge point 4 to the target lane 2 is equal to or greater than the provisional merge point threshold distance, i.e., in the case of Yes in step S204, in step S205, a lane-to-lane distance L1 to the target lane 2 is calculated for coordinates on the own lane 1 on the side frontward of the provisional merge point 4, on the basis of the provisional merge point 4 set in step S202, the coordinate information of the target lane 2 included in the map information, and the positional relationship between the own lane 1 and the target lane 2.

In performing step S205, it is assumed that the lane-to-lane distance L1 monotonically decreases as the coordinates on the own lane 1 advances frontward from the provisional merge point 4.

In step S206, on the own lane 1 on the side frontward of the provisional merge point 4, a point N1 closest to the provisional merge point 4 among points on the own lane 1 at which the lane-to-lane distance L1 from coordinates on the own lane 1 to the target lane 2 is smaller than the lane-to-lane threshold distance, is set as a frontward specific attention point. For example, in the merge scene shown in FIG. 6, the point N1 which is the frontward specific attention point is the second frontward attention point 5 counted frontward from the provisional merge point 4. Further, on the own lane 1 on the side rearward of the point N1, a point M1 closest to the point N1 which is the frontward specific attention point among points on the own lane 1 at which the lane-to-lane distance L1 from the own lane 1 to the target lane 2 is equal to or greater than the lane-to-lane threshold distance, is set as a rearward specific attention point.

In step S207, using the coordinate information of the frontward specific attention point (N1) and the rearward specific attention point (M1) set in step S206, the first approximation expression which is an approximation expression for the own lane 1 near the provisional merge point 4 is derived.

In step S208, a second approximation expression is derived by approximating coordinates on the target lane 2 including coordinates of the position at the shortest distance from the provisional merge point 4.

In step S209, among points at which the distance between a point on the second approximation expression representing the target lane 2 and a point on the first approximation expression representing the own lane 1, i.e., the lane-to-lane distance LS, is equal to or smaller than the lane-to-lane threshold distance, a point closest to the own-vehicle position, on the target lane 2, is estimated as a merging-possible area start point.

On the other hand, in step S204, if the provisional merge point lane-to-lane distance LM from the provisional merge point 4 to the target lane 2 is smaller than the provisional merge point threshold distance, i.e., in the case of No in step S204, in step S220, a lane-to-lane distance L2 from the own lane 1 to the target lane 2 is calculated for coordinates on the own lane 1 on the side rearward of the provisional merge point 4, on the basis of the provisional merge point 4 set in step S202, the coordinate information of the target lane 2 included in the map information, and the positional relationship between the own lane 1 and the target lane 2.

In performing step S220, it is assumed that the lane-to-lane distance L2 monotonously increases as the coordinates on the own lane 1 become away rearward from the provisional merge point 4. Here, targets for which the lane-to-lane distance L2 is calculated are coordinates on the own lane 1 at which the lane-to-lane distance L2 is equal to or greater than the provisional merge point threshold distance.

In step S221, on the own lane 1 on the side frontward of the provisional merge point 4, a point N2 closest to the provisional merge point 4 among points at which the lane-to-lane distance L2 from the own lane 1 to the target lane 2 is smaller than the provisional merge point threshold distance, is set as a frontward specific attention point. In addition, on the side rearward of the point N2, a point M2 closest to the point N2 among points at which the lane-to-lane distance L2 between the own lane 1 and the target lane 2 is equal to or greater than the provisional merge point threshold distance, is set as a rearward specific attention point.

In processing after step S221, the processing in steps S207 to S209 described above is performed.

In the subsequent processing from step S207, as shown in FIG. 4, the target lane 2 may be approximated as a straight line, and with the target lane 2 defined as x axis and an axis orthogonal to the x axis defined as y axis, the approximation expression for the own lane 1 may be represented as a function f, i.e., $y=f(x)$.

The vehicle control unit 110 outputs a control quantity for the own vehicle on the basis of the merging-possible area start point estimated by the merging-possible area start point estimation unit 106. For example, in a case of using vehicle control technology such as model prediction control, vehicle control is performed with a constraint condition set so as not to perform lane change before the merging-possible area start point.

The merge assistance method according to the second embodiment is as described above.

Effects of Second Embodiment

As described above, in the merge assistance method according to the second embodiment, using a merge start point acquired from the map information in the locator, i.e., the provisional merge point 4, on the basis of the provisional merge point lane-to-lane distance LM from the provisional merge point 4 to the target lane 2 and the provisional merge point threshold distance, the frontward specific attention point and the rearward specific attention point are set on the own lane 1. Using the coordinates of the frontward specific attention point and the rearward specific attention point, the first approximation expression representing the own lane 1 near the provisional merge point 4 is derived, and the second approximation expression approximating the target lane 2 including the coordinates of the position at the shortest distance from the provisional merge point 4 is derived. Among points on the target lane 2 at which the lane-to-lane distance between the own lane 1 and the target lane 2 is equal to or smaller than the lane-to-lane threshold distance, a point closest to the own-vehicle position is estimated as the merging-possible area start point. This provides an effect of obtaining a merge assistance method that enables highly accurate estimation for the merging-possible area start point when the own vehicle merges from the own lane 1 to the target lane 2.

Third Embodiment

Figure 7:
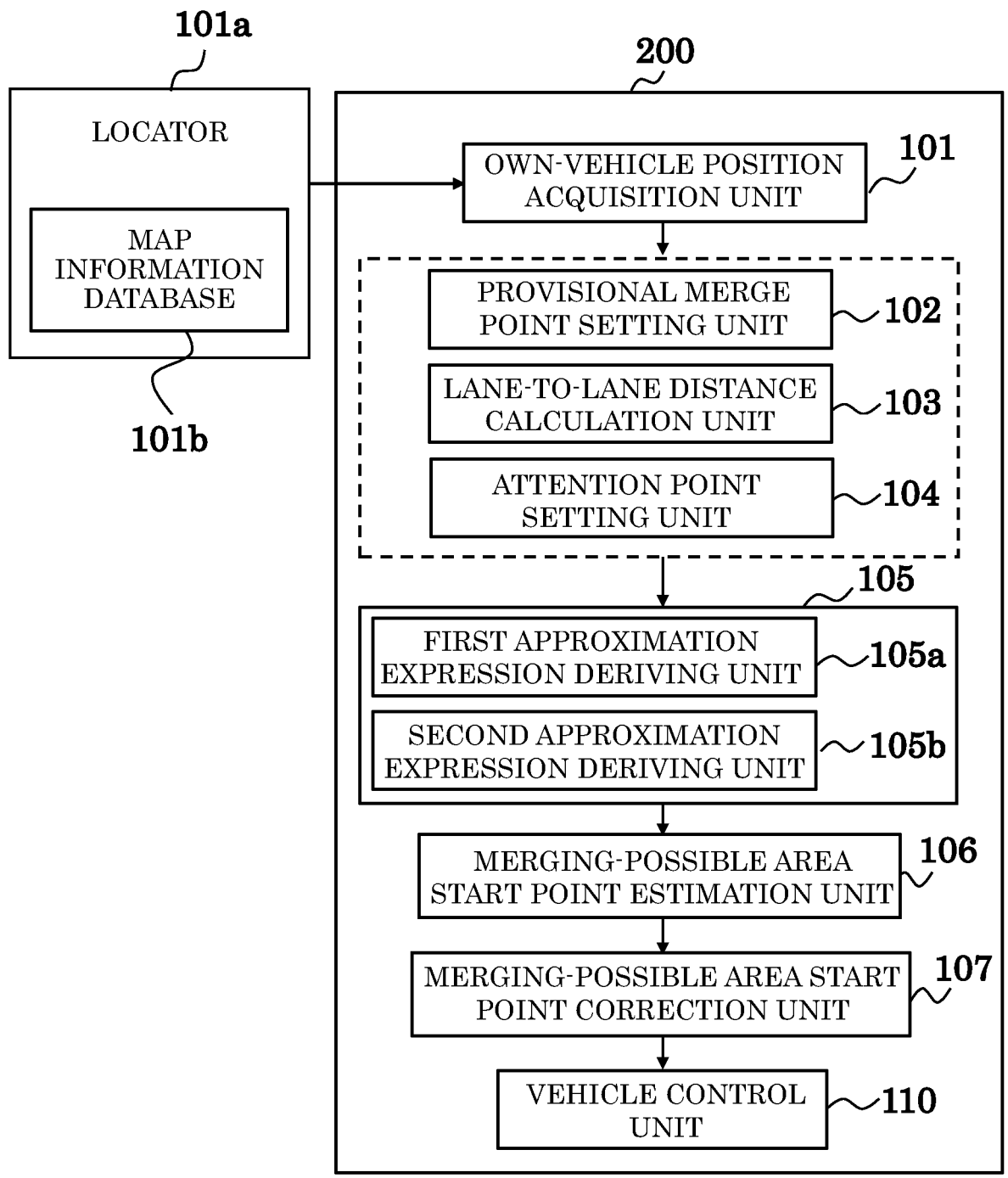
FIG. 7 is a function block diagram showing the configuration of a merge assistance device according to the third embodiment of the present disclosure.

FIG. 7 is a function block diagram showing the configuration of a merge assistance device 200 according to the third embodiment of the present disclosure. The merge assistance device 200 shown in FIG. 7 further includes a merging-possible area start point correction unit 107 in addition to the configuration of the merge assistance device 100 according to the first embodiment. Description of the same components as those in the merge assistance device 100 according to the first embodiment is omitted.

The merging-possible area start point correction unit 107 corrects a distance (hereinafter, referred to as start point distance LB) from the provisional merge point 4 to the merging-possible area start point estimated by the merging-possible area start point estimation unit 106, so that the start point distance LB becomes equal to a first start point threshold distance or a second start point threshold distance determined on the basis of a section ID of a road outputted from the locator 101a, in accordance with a condition. Then, the merging-possible area start point correction unit 107 outputs the merging-possible area start point after the correction (hereinafter, referred to as corrected merging-possible area start point), to the vehicle control unit 110.

The first start point threshold distance and the second start point threshold distance may be set to values different among maps specified by section IDs of roads.

Figure 8:
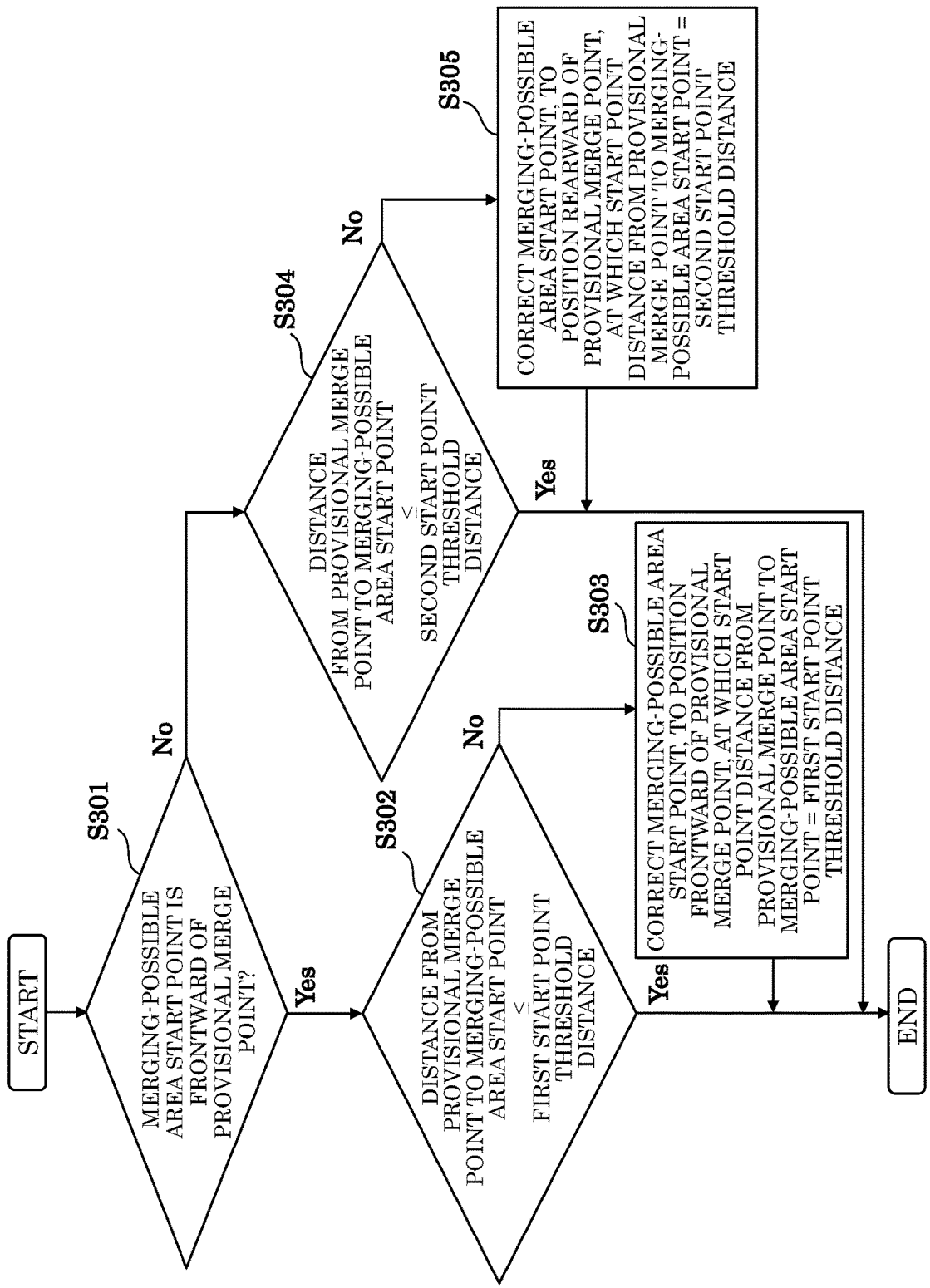
FIG. 8 is a flowchart showing a merge assistance method according to the third embodiment.

With reference to a flowchart in FIG. 8, a merge assistance method according to the third embodiment will be described. The flowchart in FIG. 8 shows operations after the step in which the merging-possible area start point is estimated by the merge assistance method according to the first or second embodiment.

In step S301, whether the estimated merging-possible area start point on the target lane 2 is present frontward or rearward of the provisional merge point 4, is determined. If the merging-possible area start point is present frontward of the provisional merge point 4, i.e., in the case of Yes in step S301, in step S302, whether or not the start point distance LB from the provisional merge point 4 to the merging-possible area start point is equal to or smaller than the first start point threshold distance, is determined. The first start point threshold distance may be variable in accordance with the section ID of the road outputted from the locator 101a, or may be set separately.

If the start point distance LB from the provisional merge point 4 to the merging-possible area start point is greater than the first start point threshold distance, i.e., in the case of No in step S302, in step S303, the merging-possible area start point is corrected to a point on the target lane 2 on the side frontward of the provisional merge point 4, at which the start point distance LB from the provisional merge point 4 to the merging-possible area start point is equal to the first start point threshold distance, as the corrected merging-possible area start point. On the other hand, if the start point distance LB from the provisional merge point 4 to the merging-possible area start point is equal to or smaller than the first start point threshold distance, i.e., in the case of Yes in step S302, the merging-possible area start point estimated by the merging-possible area start point estimation unit 106 is used.

If the merging-possible area start point is not present frontward of the provisional merge point 4, i.e., in the case of No in step S301, in step S304, whether or not the start point distance LB from the provisional merge point 4 to the merging-possible area start point is equal to or smaller than the second start point threshold distance, is determined. The second start point threshold distance may be variable in accordance with the section ID of the road outputted from the locator 101a, or may be set separately.

If the start point distance LB from the provisional merge point 4 to the merging-possible area start point is greater than the second start point threshold distance, i.e., in the case of No in step S304, in step S305, the merging-possible area start point is corrected to a point on the target lane 2 on the side rearward of the provisional merge point 4, at which the start point distance LB from the provisional merge point 4 to the merging-possible area start point is equal to the second start point threshold distance, as the corrected merging-possible area start point. On the other hand, if the start point distance LB from the provisional merge point 4 to the merging-possible area start point is equal to or smaller than the second start point threshold distance, i.e., in the case of Yes in step S304, the merging-possible area start point estimated by the merging-possible area start point estimation unit 106 is used.

Effects of Third Embodiment

As described above, in the merge assistance device 200 and the merge assistance method according to the third embodiment, if the start point distance LB from the provisional merge point 4 acquired from the map information in the locator 101a to the merging-possible area start point estimated in the first or second embodiment is greater than the first start point threshold distance or the second start point threshold distance, correction is performed so that a point away from the provisional merge point 4 by the first start point threshold distance or the second start point threshold distance becomes the corrected merging-possible area start point. This provides an effect of obtaining a merge assistance device and a merge assistance method in which, for example, even in a case where inaccurate information is included in the map information outputted from the locator 101a and therefore the merging-possible area start point estimated by the merging-possible area start point estimation unit 106 has an abnormal value, the corrected merging-possible area start point can be used, thus enhancing the possibility that autonomous merging control can be performed.

Fourth Embodiment

Figure 9:
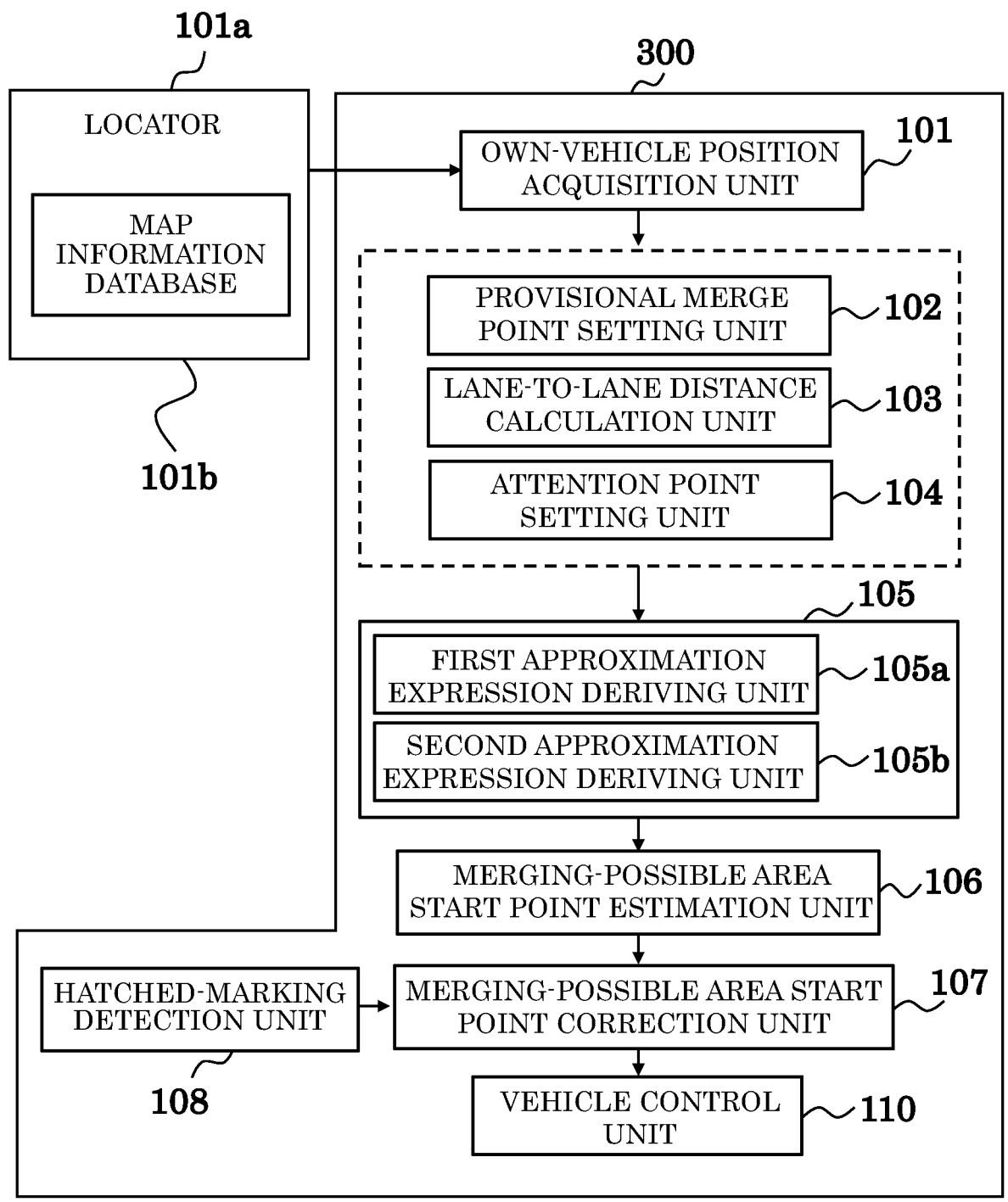
FIG. 9 is a function block diagram showing the configuration of a merge assistance device according to the fourth embodiment of the present disclosure.

FIG. 9 is a function block diagram showing the configuration of a merge assistance device 300 according to the fourth embodiment of the present disclosure. The merge assistance device 300 shown in FIG. 9 further includes a hatched-marking detection unit 108 in addition to the configuration of the merge assistance device 200 according to the third embodiment. Description of the same components as those in the merge assistance device according to the first or third embodiment is omitted.

The hatched-marking detection unit 108 outputs hatched-marking area information obtained on the basis of image information acquired by an on-vehicle front camera (not shown), to the merging-possible area start point correction unit 107. The hatched-marking area information includes information about a hatched-marking area leading end.

Figure 10:
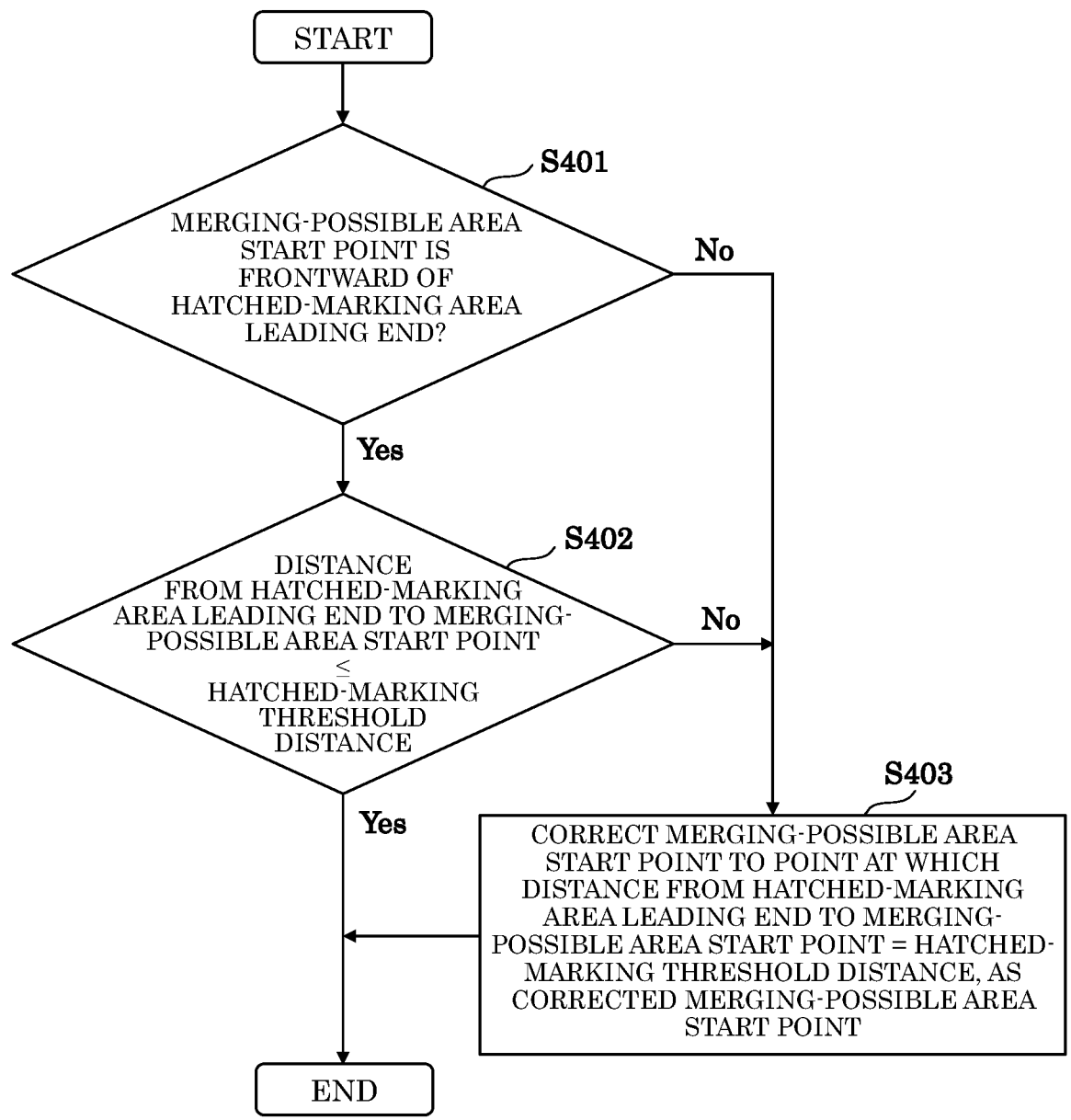
FIG. 10 is a flowchart showing a merge assistance method according to the fourth embodiment.

With reference to a flowchart shown in FIG. 10, operations of the merging-possible area start point correction unit 107 and the hatched-marking detection unit 108 will be described. The flowchart in FIG. 10 shows operations after the step in which the merging-possible area start point is estimated or corrected by the merge assistance method according to the third embodiment.

In step S401, on the basis of the hatched-marking area information detected by the hatched-marking detection unit 108, the merging-possible area start point correction unit 107 determines whether the merging-possible area start point is located frontward or rearward of the hatched-marking area leading end.

If the merging-possible area start point is located frontward of the hatched-marking area leading end, i.e., in the case of Yes in step S401, in step S402, whether or not a hatched-marking distance LZ from the hatched-marking area leading end to the merging-possible area start point is equal to or smaller than a hatched-marking threshold distance, is determined.

If the hatched-marking distance LZ from the hatched-marking area leading end to the merging-possible area start point is equal to or smaller than the hatched-marking threshold distance, i.e., in the case of Yes in step S402, the corrected merging-possible area start point corrected by the merging-possible area start point correction unit 107 is used. In a case where the merging-possible area start point is not corrected by the merging-possible area start point correction unit 107, the merging-possible area start point estimated by the merging-possible area start point estimation unit 106 is used.

If the merging-possible area start point is not located frontward of the hatched-marking area leading end, i.e., in the case of No in step S401, or if the hatched-marking distance LZ from the hatched-marking area leading end to the merging-possible area start point is greater than the hatched-marking threshold distance, i.e., in the case of No in step S402, in step S403, the merging-possible area start point is corrected to a point at which the hatched-marking distance LZ from the hatched-marking area leading end to the merging-possible area start point is equal to the hatched-marking threshold distance, as the corrected merging-possible area start point.

Effects of Fourth Embodiment

As described above, in the merge assistance device 300 and the merge assistance method according to the fourth embodiment, using the hatched-marking area information acquired from image information obtained by an image camera or the like, processing is further performed for the merging-possible area start point or the corrected merging-possible area start point estimated or corrected in the merge assistance method according to the third embodiment, so that, if the hatched-marking distance LZ from the hatched-marking area leading end to the merging-possible area start point is greater than the hatched-marking threshold distance, the merging-possible area start point is corrected to a point on the frontward side at which the hatched-marking distance LZ from the hatched-marking area leading end to the merging-possible area start point is equal to the hatched-marking threshold distance, as the corrected merging-possible area start point. This provides an effect of obtaining a merge assistance device and a merge assistance method in which, for example, even in a case where inaccurate information is included in the map information outputted from the locator 101a and therefore the merging-possible area start point estimated by the merging-possible area start point estimation unit 106 or the corrected merging-possible area start point corrected by the merging-possible area start point correction unit 107 has an abnormal value, the further corrected merging-possible area start point can be used, thus enhancing the possibility that autonomous merging control can be performed.

In the above description, the configuration in which the functions of components of the merge assistance devices 100, 200, 300 according to the first, third, and fourth embodiments are implemented by one of hardware and software, etc., has been described. However, without limitation thereto, some of the components of the merge assistance devices 100, 200, 300 according to the first, third, and fourth embodiments may be implemented by dedicated hardware, and the other components may be implemented by software, etc.

Figure 11:
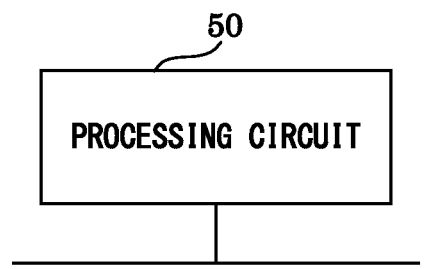
FIG. 11 is a function block diagram showing a hardware configuration for implementing the merge assistance device according to any of the first, third, and fourth embodiments.
Figure 12:
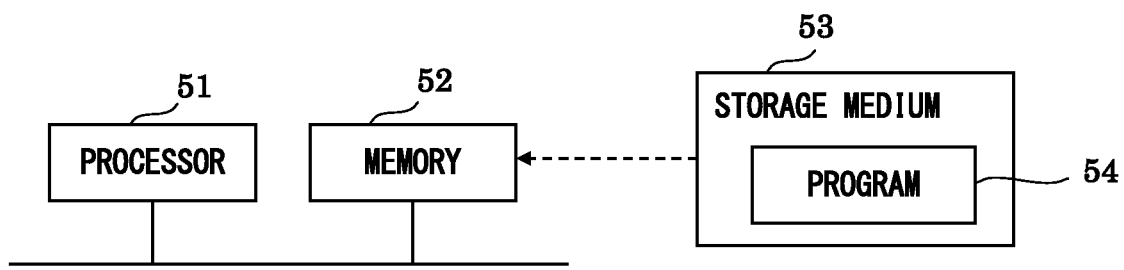
FIG. 12 is a function block diagram showing a hardware configuration for implementing the merge assistance device according to any of the first, third, and fourth embodiments.

For example, as shown in function block diagrams in FIG. 11 and FIG. 12, for some components, the functions thereof may be implemented by a processing circuit 50 as dedicated hardware, and for the other components, the processing circuit 50 as a processor 51 may read and execute a program 54, stored in a memory 52, for causing a computer or the like to execute a software part of the merge assistance devices 100, 200, 300 according to the first, third, and fourth embodiments, thereby implementing the functions of the other components.

Further, as shown in FIG. 12, setting data to be used in the function units and the like of the merge assistance devices 100, 200, 300 according to the first, third, and fourth embodiments may be installed as a part of software to the memory 52 from a storage medium 53 storing the program 54 for causing a computer or the like to execute a software part of the merge assistance devices 100, 200, 300 according to the first, third, and fourth embodiments.

As described above, the merge assistance devices 100, 200, 300 according to the first, third, and fourth embodiments can implement the above-described functions by hardware, software, etc., or a combination thereof.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 own lane
2 target lane
4 provisional merge point
5 frontward attention point
6 rearward attention point
50 processing circuit
51 processor
52 memory
53 storage medium
54 program
100, 200, 300 merge assistance device
101 own-vehicle position acquisition unit
101a locator
101b map information database
102 provisional merge point setting unit
103 lane-to-lane distance calculation unit
104 attention point setting unit
105 approximation expression deriving unit
105a first approximation expression deriving unit
105b second approximation expression deriving unit
106 merging-possible area start point estimation unit
107 merging-possible area start point correction unit
108 hatched-marking detection unit
110 vehicle control unit

What is claimed is:

1. A merge assistance device for assisting merge from an own lane on which an own vehicle travels, to a target lane, the merge assistance device comprising at least one processor configured to implement:
an own-vehicle position acquisition circuitry for acquiring an own-vehicle position determined by a locator;
a provisional merge point setting circuitry for setting a provisional merge point on the own lane on the basis of coordinate information of the own lane and the target lane included in map information stored in a map information database;
a lane-to-lane distance calculator for calculating a lane-to-lane distance from each point on the own lane to each point on the target lane;
an attention point setting circuitry which, on the basis of a provisional merge point lane-to-lane distance from the provisional merge point to the target lane calculated by the lane-to-lane distance calculator, sets one or more frontward attention points on the own lane on a side frontward of the provisional merge point and sets one or more rearward attention points on the own lane on a side rearward of the provisional merge point;
a first approximation expression deriving circuitry for deriving a first approximation expression approximating coordinates of the one or more frontward attention points and the one or more rearward attention points;
a second approximation expression deriving circuitry for deriving a second approximation expression approximating coordinates on the target lane including coordinates of a position at a shortest distance from the provisional merge point; and
a merging-possible area start point estimator which, on the basis of an own-lane width and a target-lane width included in the map information, and the first approximation expression and the second approximation expression, estimates, on the target lane, a merging-possible area start point which is a start point of an area where the own vehicle becomes able to merge from the own lane to the target lane.

2. The merge assistance device according to claim 1, wherein
the merging-possible area start point is, among points represented by the second approximation expression, a point at which a lane-to-lane distance between the point and a corresponding point represented by the first approximation expression is equal to or smaller than a lane-to-lane threshold distance, and which is closest to the own-vehicle position, on the target lane.

3. The merge assistance device according to claim 1, further comprising a merging-possible area start point corrector which, if a start point distance from the provisional merge point to the merging-possible area start point is greater than a first start point threshold distance, corrects the merging-possible area start point to a point away frontward from the provisional merge point by the first start point threshold distance, as a corrected merging-possible area start point.

4. The merge assistance device according to claim 3, wherein
if the merging-possible area start point is located rearward of the provisional merge point and the start point distance is equal to or smaller than a second start point threshold distance, the merging-possible area start point is kept, and
if the start point distance is greater than the second start point threshold distance, the merging-possible area start point is corrected to a point away rearward from the provisional merge point by the second start point threshold distance, as a corrected merging-possible area start point.

5. The merge assistance device according to claim 4, wherein
the first start point threshold distance and the second start point threshold distance are set for each section ID of roads included in the map information.

6. The merge assistance device according to claim 3, further comprising a hatched-marking detector for detecting a hatched-marking area provided on a road, wherein
if a hatched-marking distance from a hatched-marking area leading end acquired by the hatched-marking detector to the merging-possible area start point is greater than a hatched-marking threshold distance, the merging-possible area start point corrector corrects the merging-possible area start point to a point away frontward from the hatched-marking area leading end by the hatched-marking threshold distance, as a corrected merging-possible area start point.

7. The merge assistance device according to claim 1, further comprising a vehicle controller for controlling traveling of the own vehicle on the basis of a constraint condition for performing lane change from the own lane to the target lane at the merging-possible area start point or on a side frontward of the merging-possible area start point.

8. A merge assistance device for assisting merge from an own lane on which an own vehicle travels, to a target lane, the merge assistance device comprising at least one processor configured to implement:
an own-vehicle position acquisition circuitry for acquiring an own-vehicle position determined by a locator;
a provisional merge point setting circuitry for setting a provisional merge point on the own lane on the basis of coordinate information of the own lane and the target lane included in map information stored in a map information database;
a lane-to-lane distance calculator for calculating a lane-to-lane distance from each point on the own lane to each point on the target lane;
an attention point setting circuitry which sets a frontward specific attention point on the own lane on a side frontward of the provisional merge point, and sets a rearward specific attention point on the own lane on a side rearward of the provisional merge point;
a first approximation expression deriving circuitry for deriving a first approximation expression approximating coordinates of the frontward specific attention point and the rearward specific attention point;
a second approximation expression deriving circuitry for deriving a second approximation expression approximating coordinates on the target lane including coordinates of a position at a shortest distance from the provisional merge point; and
a merging-possible area start point estimator which, on the basis of an own-lane width and a target-lane width included in the map information, and the first approximation expression and the second approximation expression, estimates, on the target lane, a merging-possible area start point which is a start point of an area where the own vehicle becomes able to merge from the own lane to the target lane, wherein
the attention point setting circuitry
if a shortest distance from the provisional merge point to the target lane is equal to or greater than a provisional merge point threshold distance, sets, on the side frontward of the provisional merge point on the own lane, a point at which the lane-to-lane distance is smaller than the provisional merge point threshold distance and which is closest to the provisional merge point, as the frontward specific attention point, and sets, on the side rearward of the provisional merge point on the own lane, a point at which the lane-to-lane distance is equal to or greater than the provisional merge point threshold distance and which is closest to the frontward specific attention point, as the rearward specific attention point, and
if the shortest distance from the provisional merge point to the target lane is smaller than the provisional merge point threshold distance, sets, on a side rearward of the provisional merge point on the own lane, a point at which the lane-to-lane distance is equal to or greater than the provisional merge point threshold distance and which is closest to the provisional merge point, as the rearward specific attention point, and sets, on the side frontward of the provisional merge point on the own lane, a point at which the lane-to-lane distance is smaller than the provisional merge point threshold distance and which is closest to the rearward specific attention point, as the frontward specific attention point.

9. A merge assistance method for assisting merge from an own lane on which an own vehicle travels, to a target lane, the merge assistance method comprising:
acquiring an own-vehicle position determined by a locator;
setting a provisional merge point on the own lane on the basis of coordinate information of the own lane and the target lane included in map information stored in a map information database;
calculating a lane-to-lane distance from each point on the own lane to each point on the target lane;
setting one or more frontward attention points on the own lane on a side frontward of the provisional merge point and setting one or more rearward attention points on the own lane on a side rearward of the provisional merge point on the basis of a provisional merge point lane-to-lane distance from the provisional merge point to the target lane calculated in the lane-to-lane distance calculating;
deriving a first approximation expression approximating coordinates of the one or more frontward attention points and the one or more rearward attention points;
deriving a second approximation expression approximating coordinates on the target lane including coordinates of a position at a shortest distance from the provisional merge point; and
estimating, on the target lane, a merging-possible area start point which is a start point of an area where the own vehicle becomes able to merge from the own lane to the target lane on the basis of an own-lane width and a target-lane width included in the map information, and the first approximation expression and the second approximation expression.

10. The merge assistance method according to claim 9, wherein the merging-possible area start point is, among points represented by the second approximation expression, a point at which a lane-to-lane distance between the point and a corresponding point represented by the first approximation expression is equal to or smaller than a lane-to-lane threshold distance, and which is closest to the own-vehicle position, on the target lane.

11. The merge assistance method according to claim 9, further comprising correcting the merging-possible area start point to a point away frontward from the provisional merge point by the first start point threshold distance, as a corrected merging-possible area start point, if a start point distance from the provisional merge point to the merging-possible area start point is greater than a first start point threshold distance.

12. The merge assistance method according to claim 11, wherein if the merging-possible area start point is located rearward of the provisional merge point and the start point distance is equal to or smaller than a second start point threshold distance, the merging-possible area start point is kept, and if the start point distance is greater than the second start point threshold distance, the merging-possible area start point is corrected to a point away rearward from the provisional merge point by the second start point threshold distance, as a corrected merging-possible area start point.

13. The merge assistance method according to claim 12, wherein the first start point threshold distance and the second start point threshold distance are set for each section ID of roads included in the map information.

14. The merge assistance method according to claim 11, further comprising detecting a hatched-marking area provided on a road, wherein in the merging-possible area start point correcting, if a hatched-marking distance from a hatched-marking area leading end acquired in the hatched-marking detecting to the merging-possible area start point is greater than a hatched-marking threshold distance, the merging-possible area start point is corrected to a point away frontward from the hatched-marking area leading end by the hatched-marking threshold distance, as a corrected merging-possible area start point.

15. A merge assistance method for assisting merge from an own lane on which an own vehicle travels, to a target lane, the merge assistance method comprising:

acquiring an own-vehicle position determined by a locator;

setting a provisional merge point on the own lane on the basis of coordinate information of the own lane and the target lane included in map information stored in a map information database;

calculating a lane-to-lane distance from each point on the own lane to each point on the target lane;

setting a frontward specific attention point on the own lane on a side frontward of the provisional merge point, and setting a rearward specific attention point on the own lane on a side rearward of the provisional merge point;

deriving a first approximation expression approximating coordinates of the frontward specific attention point and the rearward specific attention point;

deriving a second approximation expression approximating coordinates on the target lane including coordinates of a position at a shortest distance from the provisional merge point; and estimating, on the target lane, a merging-possible area start point which is a start point of an area where the own vehicle becomes able to merge from the own lane to the target lane, on the basis of an own-lane width and a target-lane width included in the map information, and the first approximation expression and the second approximation expression, wherein in the attention point setting, if a shortest distance from the provisional merge point to the target lane is equal to or greater than a provisional merge point threshold distance, on the side frontward of the provisional merge point on the own lane, a point at which the lane-to-lane distance is smaller than the provisional merge point threshold distance and which is closest to the provisional merge point, is set as the frontward specific attention point, and on the side rearward of the provisional merge point on the own lane, a point at which the lane-to-lane distance is equal to or greater than the provisional merge point threshold distance and which is closest to the frontward specific attention point, is set as the rearward specific attention point, and if the shortest distance from the provisional merge point to the target lane is smaller than the provisional merge point threshold distance, on a side rearward of the provisional merge point on the own lane, a point at which the lane-to-lane distance is equal to or greater than the provisional merge point threshold distance and which is closest to the provisional merge point, is set as the rearward specific attention point, and on the side frontward of the provisional merge point on the own lane, a point at which the lane-to-lane distance is smaller than the provisional merge point threshold distance and which is closest to the rearward specific attention point, is set as the frontward specific attention point.

* * * * *